US008835058B2

United States Patent
Kia et al.

(10) Patent No.: US 8,835,058 B2
(45) Date of Patent: Sep. 16, 2014

(54) BATTERY SEPARATORS WITH VARIABLE POROSITY

(75) Inventors: Hamid G. Kia, Bloomfield Hills, MI (US); Xiaosong Huang, Sterling Heights, MI (US); Mark W. Verbrugge, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 283 days.

(21) Appl. No.: 12/974,094

(22) Filed: Dec. 21, 2010

(65) Prior Publication Data

US 2012/0156568 A1    Jun. 21, 2012

(51) Int. Cl.
*H01M 2/16* (2006.01)
*H01M 2/14* (2006.01)
*H01M 10/0525* (2010.01)
*H01M 2/18* (2006.01)

(52) U.S. Cl.
CPC ............... *H01M 2/18* (2013.01); *H01M 2/145* (2013.01); *Y02E 60/122* (2013.01); *H01M 10/0525* (2013.01); *H01M 2/1653* (2013.01)
USPC ........... 429/246; 429/142; 429/144; 429/145; 429/247

(58) Field of Classification Search
CPC ............ H01M 10/0525; H01M 2/145; H01M 2/1653; H01M 2/18; Y02E 60/122
USPC .......... 429/209–255, 129, 133, 145, 142, 144
See application file for complete search history.

(56) References Cited

U.S. PATENT DOCUMENTS

| | | | | |
|---|---|---|---|---|
| 4,330,602 A | * | 5/1982 | O'Rell et al. | 429/206 |
| 5,362,582 A | * | 11/1994 | Chang et al. | 429/249 |
| 7,439,291 B2 | | 10/2008 | Wang et al. | |
| 7,642,012 B2 | | 1/2010 | Djian et al. | |
| 2002/0142214 A1 | * | 10/2002 | Pekala et al. | 429/144 |
| 2005/0170243 A1 | * | 8/2005 | Ozawa et al. | 429/162 |

OTHER PUBLICATIONS

Daniel R. Baker et al.; Temperature and Current Distribution in Thin-Film Batteries; Journal of the Electrochemical Society 146(7) 2413-2424 (1999); S0013-4651(98)10-093-9CCC: $7.00 © The Electrochemical Society, Inc.

* cited by examiner

*Primary Examiner* — Milton I Cano
*Assistant Examiner* — Ling R Zeng
(74) *Attorney, Agent, or Firm* — Reising Ethington P.C.

(57) ABSTRACT

A porous polymer battery separator is provided that includes variable porosity along its length. Such battery separators can increase the uniformity of the current density within electrochemical battery cells that may normally experience higher current density and higher temperatures near their terminal ends than they do near their opposite ends. By disposing a variable porosity separator between the electrodes of an electrochemical cell such that its terminal end has a lower porosity than its opposite end, the transport of ions, such as lithium ions, through the separator can be more restricted in normally high current regions and less restricted in normally low current regions, thereby increasing the overall uniformity of current density within the battery cell. Variable porosity battery separators may be produced by a dry-stretching process or by a wet process.

9 Claims, 2 Drawing Sheets

BATTERY SEPARATORS WITH VARIABLE POROSITY

TECHNICAL FIELD

This disclosure pertains to separators for use between electrodes in electrochemical battery assemblies and, more specifically, to porous polymeric separators that both physically isolate opposing electrodes from one another and contain electrolyte to transport ions from one electrode to the other during battery charging and/or discharging cycles.

BACKGROUND OF THE INVENTION

Battery separators are widely used in liquid-electrolyte batteries to prevent physical contact between positive electrodes and negative electrodes within a given battery cell while simultaneously enabling ionic transport between electrodes. One type of battery separator is a porous or microporous polymeric separator. This type of separator is typically placed between the positive and negative electrodes within an electrochemical battery cell to physically isolate the electrodes from one another and to absorb liquid electrolyte into its porous structure. By being in intimate physical contact with each electrode, the separator containing the liquid electrolyte facilitates ion transport through the pores of the separator and between electrodes during the operation of the battery, either while discharging under an electrical load or while charging under an applied voltage from an external source.

Depending on the particular application for a liquid-electrolyte battery, any number of individual battery cells may be arranged in series, in parallel, or in various combinations thereof to satisfy the power requirements for the application. For example, a given battery cell is usually capable of producing a known voltage, based largely on the types of materials utilized, and has a particular current capacity, based largely on the materials utilized, the size of the components such as the electrodes and the surface area of the electrodes in contact with the electrolyte. To obtain the desired voltage from a battery, a sufficient number of individual cells are connected in series; e.g., six two-volt cells may be placed in series to obtain a twelve volt battery. To obtain the desired current capacity from the battery, multiple such sets of cells may be connected in parallel or multiple sets of cells connected in parallel may be connected in series. Of course other arrangements are possible.

In batteries that utilize multiple cells electrically connected to achieve usable power levels, one way that multiple electrodes of one polarity or the other can be connected to each another is via a common electrically conductive connection located along the same edge of each electrode. For example, individual electrodes sometimes each include a tab extending from a respective edge so that the multiple tabs of each polarity can be connected to one another by welding or some other suitable process to form an electrical connection between the individual electrodes. In some battery assemblies, such tabs extend from a top edge of each electrode or from a current collector associated therewith. Such internal battery connections may also be called internal terminals.

The inventors of the subject matter disclosed herein have recognized some potential problems that may result from battery constructions that include internal terminals such as those described above and have discovered structures and methods to help mitigate the problems.

SUMMARY OF THE INVENTION

Disclosed below are methods of making separators for use in electrochemical battery cells, such as lithium-ion battery cells. Such separators are quite thin (e.g., up to about 50 μm thick) and are placed between positive and negative electrodes in battery cells in facial contact with each of the electrodes. They may be in the form of polymeric sheets or films that are complimentary in shape with the electrodes. For example, some battery electrodes are rectangular in shape, and in a complimentary fashion, the separator films are rectangular in shape as well. The separators are characterized by an open porous structure within the separator material or materials. More specifically, the separator includes a series of pores distributed throughout the sheet along its length and width, the pores being interconnected such that they connect opposite surfaces of the film through its thickness. The pores permit liquid electrolyte flow and ion conduction through the separator.

The inventors herein have recognized that separators may be formed with a variation in the pore amount, size, and/or locations so as to provide for more uniform ionic current flow across the entire area of the separators and facing electrodes. According to the structures and methods presented below, this interconnected pore structure includes pores that may vary in size, number, spacing, and distribution along the length and/or width of the separator in a controlled manner, broadly defining a variable porosity. One end of each electrode and the complimentary-shaped separator in a battery cell typically lies in close proximity to an electrical contact of each electrode, usually in the form of metallic tabs that extend from each of the electrodes. Such tabs may join and be electrically connected to tabs from other electrodes and/or battery cells to form a common terminal. The variable porosity separators described below may be oriented in the cell so that the end of the separator furthest removed from the tabs has a higher porosity and more ionic conduction than the end of the separator located nearest the tabs. This type of configuration may be prepared to bring more uniformity to an otherwise non-uniform current density along the length of the electrodes by allowing higher levels of ion transport through the separator in the higher porosity regions furthest removed from the electrode tabs.

Taking advantage of the fact that the pores in a typical separator are included to hold a liquid electrolyte and to additionally allow flow of ions through the pores via the liquid electrolyte, the present inventors have discovered previously unknown methods of controlling the flow of ions through the pores by controlling the size and distribution of the pores, along with methods to control the size and distribution of the pores so that different sizes and distributions of pores may be present within the same separator. Using the methods described below, not only can the size and distribution of pores be controlled and varied within the same separator, but the location of the different-sized pores and corresponding variations in material porosity may also be controlled within an individual separator.

The inventive methods of making variable porosity separators may generally include producing a polymer-based film and stretching it to either form pores in the film, or to increase the pore size and/or porosity within the film. The configuration of the film and the conditioning of the film prior to stretching, as described in the methods below, are previously unknown techniques. The methods may first include unconventionally producing film having a non-uniform thickness across the width of the film, typically by obtaining the film from a long or continuous film by extrusion, for example. A uniform pore structure may then be introduced into the film across its width of increasing thickness. Then, the film is conditioned and stretched to a uniform thickness for use in separator applications. By changing the shape of the film from one having a non-uniform thickness to one having a uniform thickness, the non-uniformity is transferred from the thickness of the film to the size of the pores in the film and the porosity of the film. The thinned areas of the film have larger and/or more pores for increased ionic conduction through the film in those areas in the presence of an electrolytic fluid.

In order to stretch the film of non-uniform thickness into a film having a uniform thickness, different regions of the film must be stretched in different amounts. More specifically, thicker areas of the film require more stretching or elongation than thinner areas to bring all of the areas to a common thickness. To accomplish this, the film is conditioned prior to stretching. One such conditioning technique is to selectively heat the film so that the areas of greater thickness are at a higher temperature than the areas of lesser thickness when stretched. This has the effect of lowering the stiffness or modulus of elasticity locally in the thicker, higher temperature areas of the film. When stretched after such conditioning, the thicker areas experience higher elongation than do the thinner areas due to their higher temperature and resulting lower modulus. The higher elongation brings with it a greater reduction in thickness in the corresponding areas. And the higher elongation leads to higher porosity and/or larger pore size in the corresponding areas.

In accordance with preferred embodiments, the methods may include the extrusion of a film with a uniform cross-section in the direction of extrusion and a non-uniform thickness across its width, the width being in a direction transverse to the direction of extrusion. The film contains one or more polymer components, preferably selected from the polyolefin family of polymers; e.g., polyethylene, polypropylene, etc. The film can be a dry film, as with a conventional polymer melt extrusion process, or it can be a wet film that is a gel-like solution of the polymer and a solvent such as paraffin oil. Extruded dry films may be subjected to an annealing process to increase the level of crystallinity and the level of uniformity of the crystallinity of the polymer. Boundaries and/or an amorphous phase between individual crystalline regions within the film are the pore sites where pores will be subsequently formed. Extruded wet films may be subjected to a solvent extraction process, where the film is exposed to a volatile solvent to extract the non-polymer components of the gel-like film, leaving pores within the remaining polymer component or components where the non-polymer components previously resided. At this point of either process, the film has non-uniform thickness, preferably thicker at one side than the other with a constant thickness gradient between the two sides, and a uniform distribution of pores or pore sites. These films can then be heated and stretched as previously described in summary, and as will be described in further detail below, to produce a film having variable porosity along its length and that can be used as a battery separator to control ionic flow between electrodes.

Using these or other methods, an electrochemical battery cell may be produced according to a preferred embodiment. The electrochemical cell is preferably a lithium-ion cell and includes a positive electrode and a negative electrode with a porous separator assembled between the electrodes and in facial contact with each electrode. The separator may be complimentary in shape with the electrodes and contains an electrolyte solution within its porous structure that is capable of transporting ions from one electrode to the other. The separator is preferably made using one or more polyolefin-based materials and has a variable porosity. The porosity may vary such that the porosity and/or pore size is smaller near the portions of the separator lying near an electrode terminal and larger in separator regions spaced from or further removed from the terminal so that ionic flow through the separator during the operation of the electrochemical cell is more restricted near the terminal end than it is near the distant end. The terminal end of a typical rectangular separator and its corresponding rectangular electrodes within a cell is typically the upper end where the current density and temperature is highest within a cell. Relative restriction of the ionic flow in this region compared to the opposite or lower end of the cell causes the cell to operate with a more uniformly distributed current density and temperature profile, eliminating many of the problems associated with non-uniform current density.

Other objects and advantages of the invention will be apparent from a description of illustrative embodiments of the invention which follow in this specification. Reference is had to drawing figures which are described in the following section of this specification.

DESCRIPTION OF PREFERRED EMBODIMENTS

The following description of the embodiment(s) is merely exemplary in nature and is not intended to limit the invention, its application, or uses.

Embodiments of this invention include practices to form porous separators for use between opposing electrodes in electrochemical battery cells. Before further illustration of porous separators and the processes that may be used to form them, it may be helpful to illustrate a typical liquid-electrolyte battery environment in which the separator functions.

Figure 1:
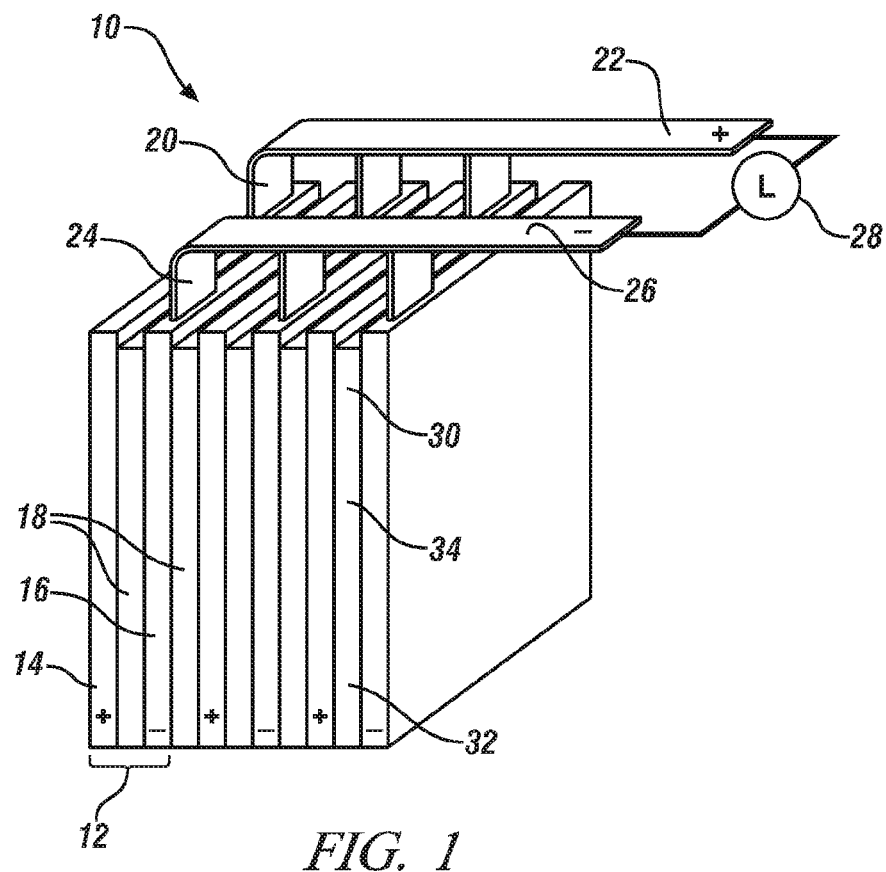
FIG. 1 is a schematic illustration of a series of electrochemical cells connected together in a parallel configuration with a positive terminal and a negative terminal connected to opposite sides of an electrical load, L.

An exemplary and schematic illustration of a typical liquid-electrolyte battery 10 is shown in FIG. 1. Battery 10 includes a plurality of adjacent electrochemical cells 12. Each cell 12 includes a positive electrode 14, a negative electrode 16, and a separator 18 disposed between the electrodes. As shown, consecutive cells share a positive or a negative electrode, 14 or 16, with one another. In this particular example, the positive electrodes 14 of each cell are electrically connected to one another via tabs 20 that extend from each electrode or from a current collector associated with each electrode. The tabs 20 meet to form a common positive terminal 22. Likewise, the negative electrodes of each cell are electrically connected via extending tabs 24, meeting to form a negative terminal 26. In this embodiment, each electrode 14, 16 is generally flat and rectangular in shape, and the tabs 20, 24 extend from the top edge of each of the electrodes. Similarly, the separator 18 may be flat and rectangular in shape, complimentary to the shape of the electrodes 14, 16, together forming an overall rectangular shape for battery 10.

Alternatively, any number of separators 18 within a cell may be included as portions of a continuous sheet or film of separator material that wraps around alternating vertical edges of each electrode to assume its functional position between each pair of electrodes. For example, in a battery such as that shown in FIG. 1, a portion of a continuous sheet of separator material may be placed between a first positive and a first negative electrode; the continuous sheet may wrap around the front vertical edge of the first positive electrode, continuing to the opposite side of the first positive electrode, between the first positive electrode and a second negative electrode in the cell; the sheet may then wrap around the rear vertical edge of the second negative electrode, then continue to the opposite side of the second negative electrode, etc. until each pair of electrodes includes separator material therebetween. As used herein, this is another example of separator 18 being complimentary in shape with the shape of electrodes 14, 16 since the vertical height of the separator material corresponds to the vertical height of the electrodes, and the length of the continuous sheet of separator material corresponds to the sum of multiple electrode widths. In some embodiments, both rectangular separators having heights and widths corresponding to the heights and widths of its adjacent electrodes and continuous separator material having a height corresponding to the height of the electrodes of a given cell and a length corresponding to the multiple widths of the electrodes that it wraps around may be used together to provide a separator between each pair of electrodes.

The positive and negative terminals 22 and 26 can be connected to an electrical device 28 as shown. In this example, the terminals 22, 26 are connected to an electrical load L that places the battery 10 into a discharge state. Alternatively electrical device 28 can be an external power source that places the battery 10 into a charging state. Electrical device 28 may be any number of known electrically-powered devices, including but not limited to an electric motor for an electric or hybrid vehicle, a laptop computer, a cellular phone, or a cordless power tool, to name but a few. The electrical device 28 may alternatively be a power-generating apparatus that charges the battery 10 for purposes of storing energy. For instance, the tendency of power generating devices such as wind-powered turbines and solar panel matrices to variably and/or intermittently generate electricity often results in a need to store surplus energy for later use. In some cases, electrical device 28 can itself double as an electrical load and a power-generating apparatus, as may be the case with electric motors of hybrid or electric vehicles, where the electric motors are utilized as battery-charging generators during vehicle deceleration, for example. Of course, FIG. 1 is only a schematic illustration and is not necessarily to scale, nor is it meant to represent the physical shapes of the electrodes 14 and 16, the separators 18, the tabs 20 and 24, or the terminals 22 and 26. The electrodes and separator may assume other complimentary shapes, such as rounded shapes, and the tabs may extend from any electrode edge. In one embodiment, the battery 10 may have a cylindrical shape, for example, where continuous layers of electrodes and separators are wrapped in a coil-like configuration, forming a battery cell wrapped continuously around itself so that the electrodes and separators have a projected rectangular area when uncoiled, but are curved rather than flat when assembly into the battery.

The inventors of the subject matter herein disclosed have recognized that by locating the electrical connection for the multiple electrodes along the same edge of each electrode, as shown and described in battery 10 of FIG. 1 for example, a variable current density may result along the surface of each electrode during the operation of the battery. This is the case even when multiple cells are not utilized. For example, with a single electrochemical battery cell having a positive and negative electrode and an electrolyte disposed therebetween, an ideal location for electrical connection of the cell to an electrical load may theoretically be in the center of each electrode, because the load can draw current equally in all directions from the surface of the electrodes. By connecting electrodes to one another, to electrical loads, or to external power sources along one edge of the electrodes, the current to and from each cell may be unevenly distributed along the electrodes. For instance, where electrodes are connected to one another along their top edges in a battery assembly, as is conventional in some types of batteries, there is a shorter electrical path near the top of the electrodes through the electrolyte than there is at the bottom, leading to increased current density near the top end of the electrodes and a lower current density near the bottom.

An uneven distribution in the current density within the battery cells can have some potentially undesirable effects, such as poor utilization of the electrode materials; i.e., portions of the electrodes closer to the tabs or internal terminals experience more electrochemical activity over the life of the battery than portions that are further from the tabs or internal terminals. In some types of battery constructions, this can cause the electrodes to decay unevenly, causing the portions that experience the higher current density to decay at an accelerated rate, while portions that experience lower current density remain underused with additional life remaining in those portions after the high current density portions have decayed beyond their usefulness. Another undesirable effect of an uneven current distribution in battery electrodes is a corresponding uneven temperature distribution within the electrochemical cell, with the higher current density regions having an elevated temperature compared to lower current density regions. Elevated temperatures within a battery cell can have the effect of degrading the polymeric material of the separator, among other detrimental effects. Uneven current distribution may also result in non-uniform expansion and contraction of the solid electrode materials. For instance, conventional lithium ion cells may expand on charge and contract on discharge. Hence, a non-uniform current distribution may lead to mechanical strains and associated stresses on the cell materials that can lead to loss of contact between cell components and accelerate cell failure.

These are only a few examples of potentially undesirable effects of an uneven current density distribution within a battery cell. The effects may be amplified with larger batteries that are designed for large electrical current capacity, for example with larger automotive batteries (as compared to smaller batteries such as those used in portable electronics or the like). Larger batteries may generally have larger and/or longer electrodes, with the resulting disparity in current density from one end of the electrode plate to the other increasing with increasing electrode length or distance from the internal terminals. Temperature effects are even further amplified in larger batteries because the ratio of the mass of the battery to the surface area of the battery generally increases, making the cooling of the already thermally insulated system more difficult overall.

In a typical embodiment, separators 18 include one or more porous, microporous, or fibrous polymeric films that have a liquid electrolyte absorbed into their structure. Specific embodiments according to the teachings presented herein will be described in further detail below. But generally, separator 18 is designed to physically separate the positive and negative electrodes 14, 16 of each cell 12 from one another while simultaneously allowing ion transfer from one electrode to the other through the pores of the separator. The separator 18 facilitates such ion transfer by having its open structure filled with liquid electrolyte and by being in intimate contact with the surfaces of each of the opposing positive and negative electrodes 14, 16.

Battery 10 can additionally include a wide range of other components that, while not depicted here, are nonetheless known to skilled artisans. For instance, battery 10 may include a casing, gaskets, terminal caps, vents, fill ports, or any other desirable components or materials that may be situated between or around the positive electrodes 14, the negative electrodes 16, and/or the separators 18 for performance related or other practical purposes. Moreover, the size and shape of the battery 10 may vary depending on the particular application for which it is designed. Battery powered automobiles and hand-held consumer electronic devices, for example, are two instances where the battery 10 would most likely be designed to different size, capacity, and power-output specifications. The battery 10 may also be connected in series or parallel with other similar batteries to produce a greater voltage output and power capacity if the electrical device 28 so requires.

The exemplary battery construction depicted in FIG. 1 and described above is meant to represent any of the various types of available batteries that utilize porous separators between opposing positive and negative electrodes. Some examples of such batteries include nickel-cadmium (NiCd), nickel-metal hydride (NiMH), lithium (Li), lithium-ion (Li-ion), zinc carbon, alkaline zinc-manganese oxide ($Zn-MnO_2$), and lead-acid batteries, to name a few. While each of these and other types of batteries may advantageously utilize the porous separators disclosed herein, a preferred type of battery is a lithium-ion battery.

Lithium-ion batteries have gained favor in many applications due to their relatively high voltage or potential per cell, relatively high energy density (available power per unit mass), ability to maintain a charge while dormant for longer periods of time than other rechargeable batteries, and a reduced presence of the "memory" phenomenon that other types of rechargeable batteries may exhibit when subjected to multiple shallow-discharge and recharge cycles.

The operation of a lithium-ion battery is well-known by skilled artisans. In a lithium-ion battery, the negative electrode 16 typically comprises a lithium insertion material or alloy host material, the positive electrode 14 typically comprises a lithium-containing active material that can store lithium at higher potential (relative to a lithium metal reference electrode) than the host material of the negative electrode 16, and the liquid electrolyte contained in the porous separator is typically an electrolyte solution comprising one or more lithium salts dissolved and ionized in a non-aqueous solvent. Each of the positive and negative electrodes 14, 16 may also be carried on or connected to a metallic current collector—typically aluminum for the positive electrodes 14 and copper for the negative electrodes 16. For example, a typical positive 14 electrode may comprise a sheet of aluminum metal foil as the current collector and be coated on both sides with an electrode material comprising a layered structure of metal oxide, such as lithium cobalt oxide ($LiCoO_2$), or a material comprising a tunneled structure, such as lithium manganese oxide ($LiMn_2O_4$). A typical negative electrode may comprise a sheet of copper metal foil as the current collector and be coated on both sides with an electrode material comprising a layered material such as a graphitic carbon.

A lithium-ion battery can generate a useful electric current during battery discharge by way of reversible electrochemical reactions that occur when electrical device 28 is an electrical load L connected between the positive terminal 22 and the negative terminal 26 at a time when the negative electrodes 16 contain a sufficiently higher relative quantity of intercalated lithium. The chemical potential difference between each positive and negative electrode 14, 16—approximately 3.7 to 4.2 volts in a lithium-ion cell, depending on the exact chemical make-up of the electrodes 14, 16—drives electrons produced by the oxidation of intercalated lithium at the negative electrode 16 through the electrical load L toward the positive electrode 14. Lithium ions, which are also produced at the negative electrode, are concurrently carried by the electrolyte solution through the porous separator 18 and toward the positive electrode 14. The electrons flowing through the electrical load L and the lithium ions migrating across the porous separator 18 in the electrolyte solution eventually reconcile and form intercalated lithium at the positive electrode 14. The electric current can be directed through the electrical load L until the intercalated lithium in the negative electrode 16 is depleted and the capacity of the battery 10 is thus diminished.

Some batteries, such as lithium ion batteries, can be charged or re-powered at any time by utilizing an external power source as electrical device 28 connected to the terminals of the battery 10 to reverse the electrochemical reactions that occur during battery discharge. In a lithium-ion battery, the connection of an external power source to the battery 10 compels the otherwise non-spontaneous oxidation of intercalated lithium at the positive electrode 14 to produce electrons and lithium ions. The electrons, which flow back towards the negative electrode 16 from the external power source, and the lithium ions, which are carried by the electrolyte across the porous separator 18 back towards the negative electrode 16, reunite at the negative electrode 16 and replenish it with intercalated lithium for consumption during the next battery discharge cycle. The external power source that may be used to charge the battery 10 may vary depending on the size, construction, and particular end-use of the battery. Some exemplary external power sources include, but are not limited to, an AC wall outlet and a motor vehicle alternator. Similar charge and discharge cycles may be described for other types of batteries where other types of metal ions are transported through the porous separator 18 from one electrode to the other, as the lithium-ion construction is only exemplary.

Referring again to FIG. 1, separators 18 may comprise any of a variety of electrically insulating materials, and typically comprise one or more polymeric materials, some examples of which will be described below in conjunction with the methods that may be used to process them. As oriented in an electrochemical battery cell, separator 18 and its various components, when applicable, may include a terminal end 30, depicted near the top end of the battery of FIG. 1, and an opposite end 32, depicted near the bottom end of the battery of FIG. 1. Separators 18 may include one or more layers of different materials or materials having different properties, porosities, thicknesses, etc. to achieve the overall desired performance properties. In one embodiment, separator 18 includes a single porous separator layer 34, but other embodiments may include multiple porous separator layers 34 or one or more porous separator layers 34 combined with other types of separator layers such as fibrous layers or other types of layers. Each separator 18 or separator layer 34 may optionally including various types of performance enhancing coatings, such as ceramic coatings.

Figure 2:
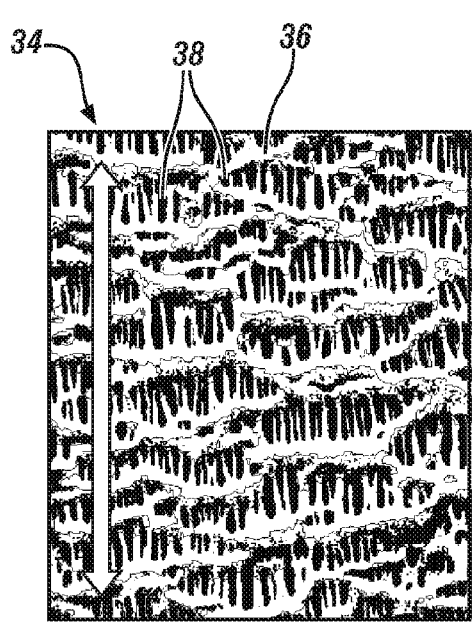
FIG. 2 is an illustration based on a micrograph of a portion of a porous separator for use between positive and negative electrodes of electrochemical cells such as those of FIG. 1, showing a porous structure that can be produced by a dry stretching process.
Figure 3:
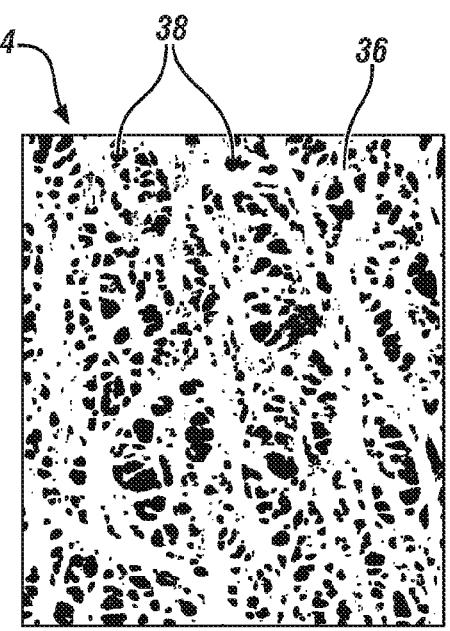
FIG. 3 is an illustration based on a micrograph of a portion of another porous separator for use between positive and negative electrodes of electrochemical cells such as those of FIG. 1, showing a porous structure that can be produced by a wet process.

Separator layer 34 may be in the form of a film or sheet and may typically have an open porous structure throughout the material, including a series of interconnected pores that connect opposite surfaces of the separator layer to one another through the thickness of the separator layer to facilitate the transfer of ions therethrough when in use and filled with electrolyte. Examples of two exemplary porous structures are depicted in FIGS. 2 and 3, which are illustrations based on micrographs of surfaces of exemplary separator layers 34. FIGS. 2 and 3 are provided only to show exemplary types of pore structures that may be produced using dry stretching or wet processes and are not intended to illustrate variable porosity structures as will be later defined. FIG. 2 illustrates one example of a porous structure that may be included within at least a portion of separator layer 34. This exemplary porous structure may be produced by a dry stretching process, examples of which will be described in further detail below. Generally, the porous structure includes a polymer matrix 36 (the light areas of the figure) and pores 38 (the dark areas of the figure) formed within the matrix 36. The particular separator layer shown in FIG. 2 has been dry-stretched at least in the direction indicated by the arrows, but may have been additionally stretched in other directions. As oriented in FIG. 2, the structure includes relatively thick and widely-spaced matrix portions arranged generally horizontally with relatively thin and narrowly-spaced matrix portions distributed between and connecting the horizontal portions. Thus, the pores in this type of structure may be elongated or slit-like in shape. The vertical separation shown between the thicker horizontal portions of the matrix may represent boundaries of polymer crystal structures that have been pulled apart by stretching the separator layer 34 in the direction indicated, while the thinner vertical portions of the matrix may represent amorphous regions of the polymer matrix material bridging the lamellar arrangement of polymer crystallites. Hence, this type of porous structure is typically created by dry-stretching a semi-crystalline polymeric material.

FIG. 3 depicts another example of a type of porous structure that may be included within at least a portion separator layer 34. This exemplary porous structure also includes a polymer matrix 36 (the light areas of the figure) and pores 38 (the dark areas of the figure) formed within the matrix 36. This type of porous structure may be produced by a wet process, examples of which will also be described in further detail below. Generally, though, a typical wet process includes melt mixing the polymer with paraffin oil and other select additives to form a homogenous mixture or solution, forming a wet film from the mixture, and then extracting the paraffin oil and other additives from the mixture with a volatile solvent. The pores 38 are formed within polymer matrix 36 by voids left behind by the paraffin oil. Because the voids left behind in a typical solvent extraction process may be too small for practical use in a separator, the particular porous structure shown in FIG. 3 is a result of bi-directionally stretching the film in directions generally perpendicular to one another, such as the extrusion direction and a direction transverse to the extrusion direction. As can be seen in FIG. 3 when compared to FIG. 2, this type of porous structure generally does not include directional, aligned, or oriented features within the structure like the structure of FIG. 2 does. Also, the pores 38 are formed in generally spherical and/or ellipsoid-like shapes that may be interconnected to form a more torturous path through the thickness of separator layer 34 than is typical with the structure of FIG. 2. However, a stretching step may be added to the wet process before or after the solvent extraction to orient the pores 38, increase the average pore size, and/or increase the overall porosity in the film. Because formation of this type of structure does not rely in any part on polymer crystals oriented in a lamellar structure to help form the pores 38, either semi-crystalline polymers, amorphous polymers, or mixtures or copolymers thereof may be used with the exemplary wet process.

The dry-stretch and wet processes summarily described above may be used to form generally uniform porous structures within a separator layer 34, such as those illustrated in FIGS. 2 and 3. A particular porous structure may be characterized by several variables, including at least its porosity and its average pore size. Porosity may be defined as the volume percentage of the material that is occupied by voids or pores. For example, typical porosities for separator layers 34 may range from 20-90%, meaning that some separator layers 34 may include one or more regions having anywhere from 10-80% of its bulk volume composed of polymer matrix 36 and 20-90% of its bulk volume composed of pores 38. More commonly, the porosity of a typical separator layer 34 produced using the above processes may range from 30-60%, and most commonly will range from 40-50%. Average pore size may be defined for a portion of a separator layer 34 as the average cross-sectional dimensions of the pores 38 within matrix 36. In most applications, an average pore size of less than 1 µm may be desirable, ranging for example from 0.01 to 1.0 µm. But average pore size can range up to 5 µm in some applications. Separator layer 34 may also be characterized by a layer thickness, which is generally uniform when formed into its final usable state and dimensions. The thickness of separator layer 34 typically ranges from about 15 to 30 µm, particularly when separator 18 is composed of a single separator layer 34. Overall separator 18 thickness may range up to about 50 µm, which may include a single separator layer 34 or multiple separator layers 34 that make up the overall thickness. Separator layers 34 can have thicknesses as low as about 10 µm in some high energy density applications, but a certain amount of strength and durability of the layer may be sacrificed with lower thicknesses. One embodiment of a separator 18 includes a single separator layer 34 having a thickness ranging from about 20 to 30 µm, and preferably about 25 µm.

Figure 4:
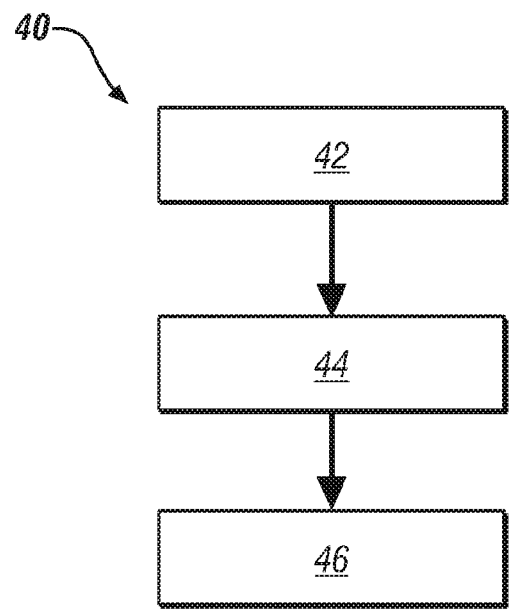
FIG. 4 is a flowchart representing some process steps that may be included in a process for producing porous separators having variable porosity.

Turning now to FIG. 4, an exemplary process 40 for producing separator layers is broadly described. More particularly, the exemplary process 40 of FIG. 4 may be used to produce separator layers having a variable porosity. The term "variable porosity" as used herein indicates that the porosity and/or the average pore size within the separator layer vary from one region to another. Exemplary process 40 generally includes the process steps of: forming a polymer-containing film having a non-uniform thickness (step 42); producing a uniform distribution of pore sites within the film (step 44); and reforming the film to a uniform thickness to achieve the variable porosity (step 46). Process 40 may be described in further detail in conjunction with the earlier described thy-stretching or wet processes.

Figure 5:
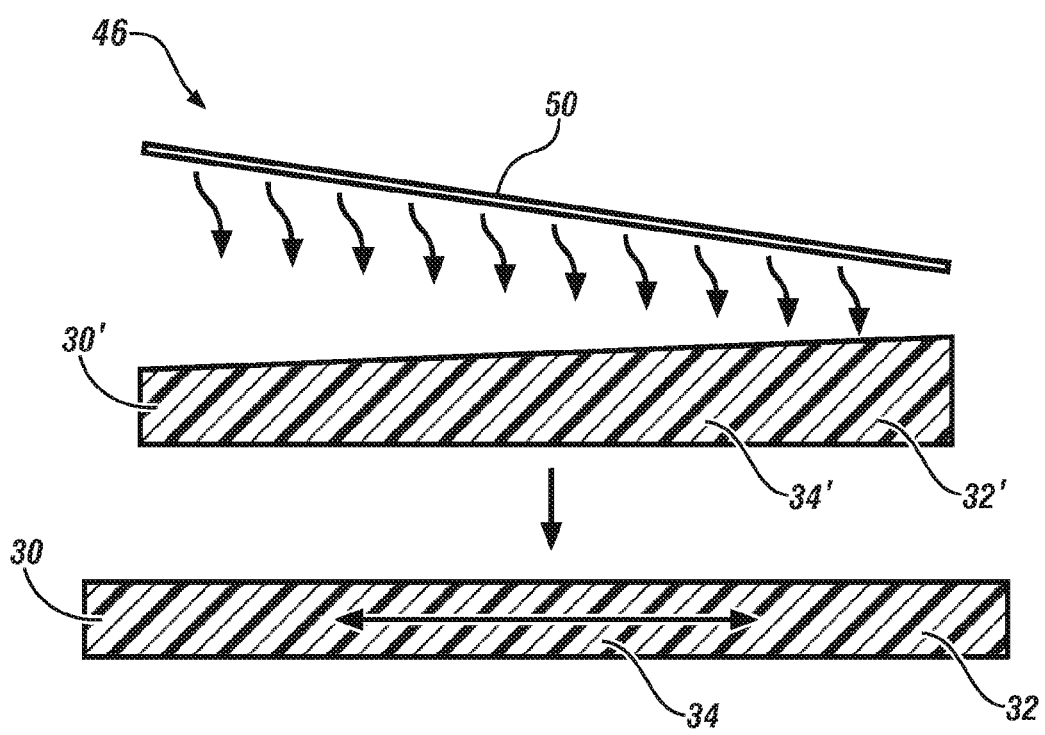
FIG. 5 is a schematic illustration of an example of the reforming step (46) of the process of FIG. 4, including selectively heating a film having a non-uniform thickness then stretching it in a transverse direction.

In an exemplary dry process, step 42 generally includes forming a polymer-containing film having a non-uniform thickness. This step preferably includes an extrusion step whereby the desired separator layer polymer composition is melt-extruded using a conventional film extrusion process. Referring to FIG. 5, a file such as film 34' may be produced via the extrusion process and preferably comprises a semi-crystalline polymer, such as a polyolefin-based material. The polyolefin-based material may include any olefinic material or combination of materials including polypropylene (PP), polyethylene (PE) (and any of its variations such as HDPE, LDPE, LLDPE or UHMWPE, for example), unsaturated polyolefins such as certain olefinic elastomers, and/or blends or copolymers thereof. Other semi-crystalline materials may be extruded to form film 34', such as polyoxymethylene (POM), isotactic poly(4-methyl-1-pentene), or others. In some cases, immiscible blends of polymers may be used where at least one polymer in the blend can form crystalline regions, such as PE-PP, polystyrene-PP, and PET-PP or PBT-PP blends. In one embodiment, optional ceramic or other types of particulate fillers, such as silica, alumina, calcium carbonate, and titanium oxide, that have particle sizes of less than 10 μm may be included with the polymer to help improve the mechanical and electro-chemical performance of the resulting separator layers. Where included, such filler loading can be anywhere from 1%-90% by weight.

FIG. 5 shows an enlarged cross-section (not to scale) taken across the width of an exemplary film having a non-uniform thickness, according to one embodiment. Film 34' may be obtained, by cutting or other suitable means, from a long or continuous film produced by an extrusion process, where the width of the film is in a direction transverse to the direction of extrusion. Alternatively, the long or continuous film can undergo the subsequent processes to introduced variable porosity across its width and can thereafter be used in an electrochemical cell wrapped around consecutive electrodes in the cell, as described previously. The cross-section of the film 34' includes first and second ends 30' and 32' along its width that correspond to opposite widthwise edges of the extrusion. As shown, second end 32' may have a thickness that is larger than that of first end 30' with the portion between the first and second ends having a continuously varying thickness. In this embodiment, the thickness gradient between first and second ends 30' and 32' is constant or linear, but other thickness gradients are possible. The thickness of film 34' may range from about 40 to 100 μm at both of the first and second ends 30' and 32'. For example, first end 30' may be about 50 μm thick, while second end 32' may be about 55 μm thick. Stated another way, the second end 32' may have a thickness about 10% greater than the thickness of first end 30'. Stated yet another way, the difference in thickness from the first end 30' to the second end 32' may range from about 4 to 60 μm. Of course, depending on the desired dimensions of the final separator layer 34, other non-uniform film thicknesses may be produced. Such a non-uniform film thickness may be produced by extruding the film through an extrusion die having a non-uniform opening. Skilled artisans will of course appreciate that other techniques may be used to produce a polymer-containing film, and some of these techniques may be modified to produce a film having a non-uniform thickness and that this process is not limited to extrusion. For example, a polymer solution may be deposited onto a substrate using a painting process, and the solvent may be subsequently evaporated to leave a polymer film behind. Where the solution is applied thicker in some portions of the substrate than in others, the resulting film may have a non-uniform thickness.

Further describing an exemplary dry process as an example of process 40, step 44 generally includes producing a uniform distribution of pore sites within the film. This step preferably includes an annealing step whereby the film 34', that preferably includes polymer materials that can form crystalline regions within the film, is heated to increase the overall crystallinity within the film, preferably forming a lamellar crystalline structure within the film as described previously. A typical annealing temperature for polyolefin-based materials may range from about 120-140° C., depending on the composition (lower temperatures for PE materials and higher temperatures for PP materials, for example). The boundaries between the individual lamellar crystalline regions within the film 34' thus become the pore sites within the film where one or more pores may be formed in subsequent steps of the process. The annealing step, besides increasing the level of crystallinity within film 34', also causes the crystalline regions, and therefore also the pore sites, to be more uniformly distributed within the film. The annealing process may occur while the film is still in continuous form as an extrusion, or it may occur after film 34' is obtained from the extruded film.

Step 46 of an exemplary dry process according to process 40 generally includes reforming the film to a uniform thickness, thereby achieving variable porosity within the finished separator layer 34, as shown in FIG. 5. This step includes at least two separate steps in this embodiment: 1) variably heating the film 34'; and 2) stretching the film 34' in the transverse direction. The variable heating step is illustrated schematically in FIG. 5. A heat source 50 may be arranged to heat different portions of film 34' to different temperatures. For example, as shown, heat source 50 may be located closer to second end 32' than to first end 30'. With such an arrangement, second end 32' is allowed to increase in temperature faster than is first end 30' such that there is a temperature distribution across the width of film 34' ranging from low to high along the width of the film 34' from first end 30' to second end 32'. In other words, the temperature of the film across its width varies with its thickness, where higher thickness regions are heated to higher temperatures than lower thickness regions. Of course, other heating arrangements are possible, such as individual heat sources arranged along the width of the film 34' at various distances from the film 34', or individual heating regions spaced equidistant from the film 34' with each heating region providing a different level of heating. In another embodiment, heat sources may be included that heat film 34' from the top as shown and from the bottom.

The objective of the variable heating is to allow the film to reach a temperature profile along its width such that in the subsequent stretching step, the final thickness of separator layer 34 is uniform. The appropriate temperature distribution will vary depending on several factors such as the type of materials in film 34' and the various thicknesses of the film. Temperatures from first end 30' to second end 32' may range from about 70-140° C. with olefin-based materials, for example. Again using polyolefin-based materials as an example, temperatures ranging from about 70-100° C. may be sufficient to create pores at the pore sites during the subsequent stretching step, while temperatures ranging from 110-140° C. may create larger pores during the subsequent stretching step, and along with the larger pores, an overall higher porosity. Thus an exemplary temperature profile across the width of film 34' may include a temperature from about 70-100° C. near the first end 30' and a temperature from about 100-140° C. near second end 32' with a gradual gradient between the two ends.

After the desired temperature profile is reached, the stretching step can be performed according to known techniques. The direction of stretching includes at least a component in the transverse direction, or across the width of the film 34', as indicated in FIG. 5. The stretching may be unidirectional in the transverse direction, or it may include an additional component or components in the extrusion direction (into and out of the page in FIG. 5) and/or in other directions. Though the stretching step may be accomplished according to known techniques, performing this step while the film 34' is heated to a variable temperature profile across the width of the film 34' is not a previously known technique. By stretching film 34', which includes a second end having a greater thickness than the first end and a temperature profile where the second end is at a higher temperature than the first end, in the same general direction as the thickness and temperature gradients, a separator layer 34 can be produced that has a uniform thickness. Separator layer 34 may be the stretched film 34', or it may be obtained from the stretched film 34'; i.e., the film 34' after stretching may be cut, trimmed, or otherwise modified to obtain an individual separator layer 34 that is complimentary in shape to the electrodes of the electrochemical cell in which it will be used. The resulting separator layer 34 produced according to this exemplary method also includes a variable porosity along its length (the width of the film 34' from which it was produced), from terminal end 30 to opposite end 32. More specifically, the resulting porosity and/or pore size at opposite end 32 is greater than that at terminal end 30. The variable porosity will result even if the film 34' has a uniform thickness prior to the stretching step, though it may then result in a final separator layer 34 having a non-uniform thickness. The non-uniform thickness of film 34' is provided to counteract the greater level of thinning of the film that takes place during the stretching step near the end of the film that is at a higher temperature.

The resulting variable porosity is due, at least in part, to stretching the film 34' while it is heated to the variable temperature profile described above. Because of the higher temperature at second end 32' than at first end 30', and because of the typical temperature dependence of the modulus of elasticity of polymer-based materials, portions of the film 34' closer to the second end 32' undergo a higher level of deformation than do portions of the film 34' that are closer to the first end 30'. Thus, the pores that are created at the pore sites are smaller near the first end of the film (corresponding to the terminal end of the separator layer) than they are near the second end of the film (corresponding to the opposite end of the separator layer). Likewise, the resulting porosity is lower near the second (opposite) end than it is near the first (terminal) end. For example, in an exemplary embodiment, the resulting porosity near the terminal end 30 of separator layer 34 may range from 20-60% and the resulting porosity near the opposite end 32 may range from 40-90%. More preferably, the porosity near the terminal end 30 ranges from 30-50% and the porosity near the opposite end 32 ranges from 40-60%. In one embodiment, separator layer 34 has a gradually increasing porosity from the terminal end 30 to the opposite end 32, where the porosity near the terminal end is at least 20% and the porosity near the opposite end is at least 30%. In yet another embodiment, the difference between the porosity near the terminal end and the porosity near the opposite end is at least 10% porosity. Preferred pore sizes are less than 1 µm at both ends of the resulting separator layer, but are larger near the opposite end 32 than they are at terminal end 30, in one embodiment being at least 10% larger. In another embodiment, average pore sizes near the terminal end 30 are less than 1 µm, and average pores sizes near the opposite end 32 are greater than 1 µm. In yet another embodiment, separator layer 34 has a gradually increasing pore size from the terminal end 30 to the opposite end 32, where the average pore size near the terminal end is less than 1 µm and the average pore size near the opposite end is at least 10% greater than the pore size at the terminal end. Of course, process variables may be adjusted to obtain pore sizes and porosities outside of these ranges, depending on the particular application.

Separator layers 34 having variable porosity as may be produced by this or other exemplary processes can help alleviate some of the potentially undesirable effects described earlier that may be caused by non-uniform current densities within electrochemical battery cells. Such separator layers having variable porosity can help alleviate these potentially undesirable effects by helping to eliminate the actual cause of the effects; namely, the non-uniform current density along a given electrode and within its corresponding battery cell or cells. For example, separators 18 in FIG. 1 can be constructed to comprise separator layers 34, made according to the exemplary process described above. Such separators 18 may be disposed between the electrodes 14, 16 of the exemplary battery 10. Because the terminal end 30 of each separator has a lower porosity than its corresponding opposite end 32, the resulting current distribution within the cells while the battery 10 is in operation is more uniform. This more uniform current distribution is due to the higher porosity portion of the separator 18 near the bottom of battery 10 allowing a higher level of ionic transport between electrodes, while the lower porosity portion of the separator 18 near the top of the battery 10 is more restrictive of ion transport between electrodes, thus evening out the tendency for the top portions of the electrodes to experience higher current density due to their proximity to the common terminals 22, 26. Uniformly distributing the current density within the battery cells thus alleviates the uneven temperature distributions within battery cells and the uneven or preferential use and cycling of certain portions of the electrodes over others.

In addition to the exemplary dry process already described for producing variable porosity separator layers, an exemplary wet process can also be described within the framework of process 40 of FIG. 4. In step 42 of an exemplary wet process, the particular polymer-containing film having a non-uniform thickness is a gel-like film than may be formed in a similar fashion as the film described earlier with the exemplary dry process, in that it includes an extrusion step. However, rather than a conventional melt extrusion, this extrusion step preferably includes the extrusion of a gel-like polymer solution that includes the desired polymer or polymer blend, a solvent, and other additives that have been heated and mixed into a homogeneous mixture or solution. A typical solvent for use in this type of extrusion may include paraffin oil, or other suitable oil that is miscible with the chosen polymer, in an amount ranging from 5-80% by weight, with the polymer being present in an amount ranging from 20-95%. As with the dry process, a preferred polymer may include olefin-based materials, but other semi-crystalline and/or amorphous materials are compatible with this process, so long as the solvent is chosen to be miscible with the polymer or polymers. The non-uniform thickness may be produced in a similar manner as with melt extrusion; i.e., by extrusion die configuration. The resulting film also may have the same dimensions described with reference to the exemplary dry process, though in gel-like films having very high solvent content, greater thicknesses may be desirable since much of the mass of the film may be removed during subsequent process steps.

Further describing an exemplary wet process, step 44 generally includes producing a uniform distribution of pore sites within the film. This step of the wet process preferably includes a solvent extraction step whereby the gel-like film 34' is subjected to a volatile solvent such as methylene chloride to extract the paraffin oil and additives from the film, leaving porous polymer behind. This solvent extraction step may be performed by known techniques, and other solvents may be utilized so long as the paraffin oil (or other chosen polymer gel-forming solvent) is readily soluble in the solvent and the polymer is not. The pore sites and, in this exemplary process, the pores, are thereby formed in a polymer matrix by the voids created when the paraffin oil is extracted. Because of the homogeneous nature of the gel-like film, the pore distribution within the resulting porous film layer is of a uniform distribution.

Step 46 of an exemplary wet process according to process 40 generally includes reforming the film to a uniform thickness in a manner substantially similar to the reforming step already described in relation to the exemplary dry process; i.e., it preferably includes heating the film 34' to a particular temperature profile across its width and stretching the film 34' to obtain a uniform thickness and a variable porosity. In another embodiment of the wet process, steps 44 and 46 may be reversed. For example, the gel-like film having a non-uniform thickness may be heated to a particular temperature profile across its width and stretched to obtain a uniform thickness before the solvent extraction step to obtain a variable porosity in the film.

Of course, the above-described wet and dry processes are only exemplary and may include additional process steps, omit certain steps, and/or include modified steps, depending on the desired final separator layer configuration and structure. For example, with reference to the dry stretching process, an additional stretching step may preferably be included prior to the step of reforming the film to a uniform thickness. Such additional stretching may be provided in the extrusion direction of the film 34' to initially open the pores at the pore sites prior to heating the film to the desired temperature profile and stretching in the transverse direction. Likewise, an additional stretching step may be included either before or after the step of solvent extraction in the wet process, particularly where semi-crystalline polymers are employed, to increase the overall porosity and/or pore size of the film 34' prior to reforming it to a uniform thickness. For example, it may be preferable to include additional stretching steps in both the extrusion direction and the transverse direction after the solvent extraction step in order to increase the overall pore size within the film to a more usable size prior to reforming the film to a uniform thickness and inducing the variable porosity. In another variation of the above presented processes, a relaxation step may be included after the heating and stretching steps. The relaxation step may be similar to the annealing step earlier described for use in the dry process, in that it can include heating the resulting separator layer to a temperature sufficient to relieve stresses in the film that may have been induced by the prior stretching step or steps.

In additional variations, the polymer film 34' produced by both of the described extrusion processes may have a non-uniform thickness other than that indicated in FIG. 5. For example, both ends of film 34' may include thicker or thinner portions than a middle portion of the film. Corresponding multiple thicker portions, for example, may be selectively heated to higher temperatures prior to stretching to form multiple regions of higher porosity than in the remainder of the resulting separator layer. Thus, porosity within a separator layer, particularly along its length from its terminal end to its opposite end, can be selectively controlled.

Such polymer-based films having controllable, variable porosity may additionally find other applications in the battery art, and are certainly not limited to use as battery separator layers, as controlled porosity may be useful for other battery applications besides controlling ionic transport between electrodes. Controllable, variable porosity films may even find useful applications outside the battery art, such as in fuel cells or in fluid filtration applications, for example.

While preferred embodiments of the invention have been described as illustrations, these illustrations are not intended to limit the scope of the invention.

The invention claimed is:

1. An electrochemical cell comprising:
a positive electrode having a shape;
a negative electrode having a shape complementary to the shape of the positive electrode, each of the positive and negative electrodes having an electrical contact located along an edge of the electrode; and
a thin polymeric separator having a shape complementary to the shapes of the positive and negative electrodes and disposed between them, the separator being in facial contact with each of the electrodes and having an open porous structure filled with an electrolyte solution for permitting the flow of ions in the cell from one electrode through the separator to the other electrode, wherein the separator has a terminal end located near the electrical contact of each electrode and an opposite end spaced away from the electrical contact of each electrode in a lengthwise direction, the porous structure including pores sized and arranged so that one or both of a porosity or an average pore size is higher at the opposite end of the separator than at the terminal end of the separator so as to more uniformly distribute ionic current flow through the separator over the whole facial area of the separator when compared to a uniform porous structure.

2. An electrochemical cell as recited in claim 1 in which the cell is a lithium-ion cell.

3. An electrochemical cell as recited in claim 1 in which the porosity at the terminal end the separator is less than the porosity at the opposite end of the separator.

4. An electrochemical cell as recited in claim 3 in which the shapes of the positive and negative electrodes and the separator are rectangular and in which the electrodes and the separator are arranged so that said edge of each of the rectangular shaped electrodes is a top edge and the terminal end of the separator being the end of the separator proximate a top edge of the separator.

5. An electrochemical cell as recited in claim 1 in which the average pore size at the terminal end the separator is less than the average pore size at the opposite end of the separator.

6. An electrochemical cell as recited in claim 5 in which the shapes of the positive and negative electrodes and the separator are rectangular and in which the electrodes and the separator are arranged so that said edge of each of the rectangular shaped electrodes is a top edge and the terminal end of the separator being the end of the separator proximate a top edge of the separator.

7. An electrochemical cell as recited in claim 1 in which the separator is fabricated from a polyolefin-based material.

8. An electrochemical cell as recited in claim 1 in which at least some of the pores are elongated in shape.

9. An electrochemical cell as recited in claim 1 in which at least some of the pores are either spherical or ellipsoidal in shape.

* * * * *